United States Patent Office 2,901,467
Patented Aug. 25, 1959

2,901,467

POLYURETHANE COATING COMPOSITIONS

Carlton W. Croco, Newark, Del., assignor to E. I. du Pont de Nemours and Company, Wilmington, Del., a corporation of Delaware No Drawing. Application April 20, 1956
Serial No. 579,460

4 Claims. (Cl. 260—77.5)

This invention relates to novel coating compositions and more particularly to stable, curable polyurethane coating compositions.

Many coating compositions have previously been proposed having isocyanate reaction products as the principal component. These have all had one or more serious deficiencies for practical use, such as brittleness, lack of abrasion resistance, lack of solvent resistance, poor resistance to the hydrolytic action of water or a very short shelf stability. This lack of stability has heretofore been overcome by the cumbersome method of providing the ingredients in two separate containers which were mixed immediately before use. The pot-life of the mixture was very short so that any not used immediately became unusable after standing a while.

This invention has as an object to provide a new coating composition. A further object is to provide a curable polyurethane coating composition. A still further object is to provide a single, curable polytetramethylene ether glycol polyurethane coating composition which is stable and which yields coatings free of the objectionable properties of prior coating compositions. Other objects will appear hereinafter.

These and other objects are accomplished by the stable, curable polyurethane coating compositions which are obtained by heating in an inert solvent (a) 1.0 molar proportion of a polytetramethylene ether glycol having a molecular weight of from about 400 to 2,000, (b) 0 to 1.0 molar proportion of an alphatic diol having from 2 to 8 carbon atoms, (c) 1.0 to 4.0 molar proportions of an aliphatic triol having from 3 to 6 carbon atoms, and (d) 4.0 to 11.0 molar proportions of an organic diisocyanate. At least 25% of the total weight of the novel coating compositions of the present invention should be the radicals obtained by removing the terminal hydrogen atoms from the polytetramethylene ether glycol reactant and the molar proportions of organic diisocyanate which are used should be selected so that the total number of isocyanate groups is at least 3 greater than but less than twice the sum of all of the hydroxyl groups which are introduced into the reaction.

The stable, curable polyurethane coating compositions are ordinarily prepared by dissolving the hydroxyl-containing reactants in an inert solvent at room temperature and then adding the organic diisocyanate. Since the reaction is exothermic, the heat of the reaction will raise the temperature of the reaction mass; however, agitation is normally employed to secure thorough mixing of the reactants and to aid in temperature control. After the initial heat of reaction, the solution is then stirred at a temperature of from about 50 to 120° C., or in some cases as high as 150° C., until substantially all of the hydroxyl groups have been reacted with isocyanate groups. This reaction gives urethane groups which link the various components together. It generally requires from about 1.5 to 10 hours to reach this point which can be determined by analysis for free isocyanate in the usual manner. It is to be understood that various modifications of this method for the preparation of these coating compositions can be made in that some of the hydroxyl-containing reactants may first be reacted with a molar excess of the organic diisocyanate, followed by the reaction of the remaining hydroxyl-containing reactants with the remaining organic diisocyanate.

The polytetramethylene ether glycol reactant used to prepare the novel coating compositions can be most easily obtained by the polymerization of tetrahydrofuran. Polytetramethylene ether glycols of molecular weight from about 400 to about 2,000 are suitable for use in these compositions. The molecular weights are determined by calculation from the hydroxyl numbers and are number average molecular weights. Since they are obtained by polymerization, molecules of both lower and higher molecular weight are present in a polytetramethylene ether glycol of any given molecular weight. Higher molecular weight polytetramethylene ether glycols give coating compositions of a softer nature than those of lower molecular weight. It is necessary that at least 25% by weight of the coating composition be the radicals obtained by removing the terminal hydrogens from the polytetramethylene ether glycol in order to obtain the superior properties exhibited by the coatings formed from these compositions.

The aliphatic diols used in the preparation of these coating compositions should have from about 2 to 8 carbon atoms. Typical diols are ethylene glycol, diethylene glycol, butane-1,4-diol, pentane-1,5-diol, 2-ethylhexane-1,3-diol, hexane-1,6-diol. Not more than 1.0 mol of diol per mol of polytetramethylene ether glycol should be used in order to obtain superior properties from the coatings made from these compositions. If desired, the diol may be omitted completely, however, in general, about 0.5 to 1.0 mol is preferred.

The aliphatic triols which are used to prepare the novel coating compositions of this invention should contain from about 3 to 6 carbon atoms. Representative triols which may be used are glycerol, 1,1,1-trimethylol propane, 1,1,1-trimethylol ethane and hexane-1,2,6-triol. In order to obtain superior properties from the coatings made from these compositions, there should be used from about 1.0 to 4.0 molar proportions of the aliphatic triol in order to bring about the proper amount of cross-linking in the finished coating compositions.

As representative of the typical organic diisocyanates which may be used in preparing the novel coating compositions of the present invention, there may be mentioned m-phenylene diisocyanate, toluene-2,4-diisocyanate, hexamethylene-1,6-diisocyanate, tetramethylene 1,4-diisocyanate, cyclohexane-1,4-diisocyanate, naphthylene-1,5-diisocyanate, 1-methoxyphenyl-2,4-diisocyanate, methylene-bis-(4-phenylisocyanate), 4,4'-biphenylene diisocyanate. Mixtures of toluene-2,4- and 2,6-diisocyanate may be used. In general, the diisocyanates having the isocyanate groups substituted on aromatic rings are preferred since they are more reactive than the aliphatic diisocyanates and hence require shorter reaction times to form the polyurethane coating compositions. From about 4.0 to 11.0 molar proportions of the organic diisocyanate reactant should be used in the preparation of these compositions; however, the specific molar proportion of diisocyanate used depends on the molar proportion of the hydroxyl-containing components which have been used. There must be at least 3 free isocyanate groups remaining after the organic diisocyanate component has reacted with all of the hydroxyl groups in order to provide at least 1 free isocyanate group or cross-linking site per polyurethane molecule. The minimum of 3 free isocyanate groups in excess over that required to react with all of the hydroxyl groups is also necessary to obtain products with excellent shelf life. It has been determined that if there are less than 3 free isocyanate groups remaining, the resulting composition thickens and gels within a relatively short time. The ratio of the total number of isocyanate groups in the diisocyanate component to the sum of all the hydroxyl groups of the polyhydroxy components must be less than 2 to 1 in order that the resulting composition have multiple urethane linkages. In addition, ratios greater than 2 to 1 are undesirable due to the toxocological hazards involved with a large excess of isocyanate groups.

The solvents employed in the preparation of these polyurethane coating compositions must be non-reactive to the isocyanates and hence must not have active hydrogens in their structure. The initial solvent must dissolve the hydroxy-containing compounds. Oxygen-containing solvents such as ketones, ethers and esters are suitable, such as methyl ethyl ketone, acetone, dipropylether, $\beta,\beta$-dichloroethyl ether, dimethyl formamide, tetrahydrofuran, ethyl acetate, methyl acetate, butylacetate, etc. They should be sufficiently low boiling that they will vaporize from the composition when coated onto a substrate in a thin film. After the reaction to form the polyurethane is complete, aromatic solvents such as toluene, xylene, etc. may be added to extend the solvent solution; however, care must be taken that mixtures of solvents do not precipitate part of the coating compositions.

The proportion of solvent may be varied over a rather wide range; however, about 70% polyurethane composition is a reasonable maximum considering that above this concentration the solution becomes so viscous that stirring is quite difficult. Correspondingly, the formation of good, homogeneous films is also difficult at higher concentrations. A practical lower limit is about 25% solids. Below this, an unnecessary quantity of solvent is used and the films formed from lower concentrations are quite thin.

The principal use of these novel compositions is in forming coatings on susbtrates. The poluyrethane solution is spread out on the surface and the solvent is permitted to evaporate. The moisture in the atmosphere reacts with the isocyanate end groups on the polyurethane molecules and links them together by the formation of urea groups. This reaction with the moisture in the air in effect cures the polyurethane to a homogeneous, continuous film. The rate of the reaction is increased as the temperature is raised above room temperature and as the amount of moisture, or relative humidity, of the ambient atmosphere is increased. Under ordinary room conditions the coatings dry tack-free in a matter of an hour or so and are completely cured in 1 to 3 days.

The films or coatings formed from these compositions are characterized by high gloss, high abrasion resistance, good flexibility, high tensile strength and good adhesion to many surfaces such as wood, metal, glass, cellulosic and synthetic fabrics, leather, ceramics, etc. The hardness of the films may be varied by choice of polytetramethylene ether glycols, the lower molecular weight ones giving harder films. The molar ratio of the triol to the polytetramethylene ether glycol also affects the hardness, higher ratios giving harder films. The harder films produced are quite mar-resistant.

The films are transparent and colorless; however, if desired, they may be pigmented. They are quite resistant to water, acid and alkali. After curing, they are no longer soluble in solvents.

The coatings may be applied to various substrates by conventional means. They may be brushed, sprayed, or coated with a doctor-blade. The drying and curing may be accelerated by the usual means used in lacquering surfaces, such as heating in an oven with indirect heat or infrared radiation. The introduction of water vapor into the atmosphere, such as a steam bleed, is also helpful in accelerating the achievement of the final state of cure.

One of the most important characteristics of these polyurethane coating compositions is that they are quite stable in the absence of moisture. After the polyurethanes are formed, the solutions are generally placed in cans and sealed. These solutions are then shelf-stable indefinitely. Heretofore, it has been necessary to have isocyanate coating compositions stored in two cans and to mix the two solutions immediately before using since the final solutions would become unusable in a relatively short time.

The following examples better illustrate the nature of the present invention; however, the invention is not intended to be limited to these examples. Parts are by weight unless otherwise indicated.

*Example 1*

94 parts of polytetramethylene ether glycol having a molecular weight of 940, 11.4 parts of pentane-1,5-diol and 26.6 parts of trimethylol propane are dissolved in 202 parts of methyl ethyl ketone. To this solution is added, with stirring, 122 parts of toluene-2,4-diisocyanate. The temperature rises to about 40° C. from the heat of reaction. The reaction mass is stirred for 7 hours at 80° C. and then cooled. Analysis for free isocyanate shows 3.22% as compared to the theoretical value of 3.68%. 122 parts of toluene is added, with stirring, to give a 38% solids solution.

Films are cast by pouring portions of the solution onto glass plates, permitting the solvent to evaporate and letting stand for 3 days to cure. The films are tough, flexible, elastic and transparent. When tested on the H-18 wheel of the Taber Abrader under a 500 g. weight for 1000 revolutions, the loss in weight is 0.12 g. (ASTM Standards, part 6, p. 680 (1952); designation D-1044-49T).

After standing in a closed can for over 4 months there is no noticeable change.

The solution is used as a varnish on a household floor where it is subjected to heavy travel. Three coats are brushed on, allowing a 10-12 hour curing period between coats. A smooth, glossy, tough, non-slippery surface is obtained. After 3 months' exposure to regular household living, there is no peeling, cracking, chipping or marring and the surface is still glossy.

Exposure of similarly coated wood panels to the weather in southern New Jersey for a period of two months shows only development of a slight yellow color but no other change in appearance.

Aluminum sheet is coated with one coat of the solution by pouring onto the sheet and levelling with a doctor-knife. After curing 24 hours in room atmosphere, an adherent, transparent, tough, flexible coating is obtained. On repeated flexing, there is no change in the appearance of the coating and no separation between the coating and the metal.

*Example 2*

47 parts of polytetramethylene ether glycol having a molecular weight of 940, 5.4 parts of pentane-1,5-diol and 19.65 parts of trimethylol propane are dissolved in 128 parts of methyl ethyl ketone. To the solution is added 79 parts of toluene-2,4-diisocyanate with stirring. The heat of reaction raises the temperature to about 55° C. after which the mass is heated to 80° C. and heating with stirring is continued for 6 hours. Analysis for free isocyanate shows 3.79% as compared to the theoretical value of 3.85%. The mass is cooled and 128 parts of toluene is added to give a solution containing 37% solids.

*Example 3*

47 parts of polytetramethylene ether glycol having a molecular weight of 940 and 13.1 parts of trimethylol propane are dissolved in 97 parts of methyl ethyl ketone. Then 53 parts of toluene-2,4-diisocyanate is added with stirring. After the initial heat of reaction, the mass is heated to 80° C. and held there for 6 hours while stirring. Analysis for free isocyanate shows 4.27% as compared to the theoretical value of 4.16%. After cooling, 97 parts of toluene is added to give a solution containing 37% solids. Tough films are obtained from this solution which have a high gloss and are not easily marred.

Example 4

49.6 parts of polytetramethylene ether glycol having a molecular weight of 496, 14.5 parts of triethylene glycol and 23.9 parts of trimethylol propane are dissolved in 101 parts of cyclohexanone. To this solution is added 122 parts of toluene-2,4-diisocyanate with stirring. After the initial heat of reaction raises the temperature to about 60° C., the mass is heated to 80–85° C. and stirred at that temperature for about 9 hours. The mass is cooled and 101 parts of xylene is added to give a 50% solids solution. Analysis for free isocyanate shows that substantially all of the hydroxyl groups have been reacted. Films brushed from this solution onto wood are very hard and mar-resistant. They have a high gloss, are very resistant to abrasion, are transparent and colorless and adhere tightly to the wood.

Example 5

47 parts of polytetramethylene ether glycol having a molecular weight of 940, 7.35 parts of 2-ethylhexane-1,3-diol and 7.1 parts of hexane-1,2,6-triol are dissolved in 52 parts of methyl ethyl ketone. To this solution is added 43.6 parts of toluene-2,4-diisocyanate with stirring. The heat of reaction raises the temperatures to about 55° C., after which the reaction mass is heated at about 80° C. for 9 hours with stirring and then cooled. The solids content is 67%. Analysis for free isocyanate shows that substantially all of the hydroxyl groups have been reacted.

Films sprayed from this solution onto a steel panel are adherent, transparent and tough. When cast on wood, they also adhere tenaciously and have a high gloss.

Example 6

80.0 parts of polytetramethylene ether glycol having a molecular weight of 1600, 5.4 parts of pentane-1,5-diol and 9.21 parts of glycerol are dissolved in 132 parts of cyclohexanone. To this solution is added 61 parts of toluene-2,4-diisocyanate while stirring. After the initial heat of reacton, the mass is stirred at 75–80° C. for 8–9 hours. After cooling, 132 parts of xylene is added to give a 37% solids content solution. Analysis for free isocyanate shows that substantially all of the hydroxyl groups have been reacted. Films cast from this solution are clear, transparent, soft and quite flexible.

Example 7

194 parts of polytetramethylene ether glycol of molecular weight 970, 20.8 parts of 1,5-pentanediol, 53.6 parts of trimethylol propane and 237 parts of methylisobutyl ketone are stirred together in a vessel with a reflux condenser. Then 283 parts of a mixture of 80% toluene-2,4-diisocyanate and 20% toluene-2,6-diisocyanate is added gradually while stirring, the temperature rising to 80° C. and being maintained there by adjusting the rate of addition of the diisocyanate. Stirring is continued at 80° C. after the addition of the diisocyanate is complete. Then 312 parts of xylene is added and stirred in to give a 50% solids solution.

This solution is put in a closed container. Its stability is shown by the fact that after six months there is no noticeable increase in viscosity.

The solution is applied to a wooden floor by brushing on. It air-cures overnight to a hard-non-tacky film. It is not marred by walking on it. It is tough and flexible and has excellent adherence to the wood. The tensile strength of such a film is 6500 lbs. It has exceptionally good resistance to cleaning solutions such as soap or synthetic detergent solutions, as well as solvents such as alcohol and also dilute acids or alkali. The solution is also valuable as a finish for concrete floors, showing good adhesion and retaining the excellent mar-resistance it shows on wood floors. It may be sprayed as well as brushed on.

Example 8

97 parts of polytetramethylene ether glycol of molecular weight 970, 53.6 parts of trimethylol propane and 163.3 parts of methylisobutyl ketone are stirred together in a vessel and then 176 parts of a mixture of 80% toluene-2,4-diisocyanate and 20% toluene-2,6-diisocyanate is added gradually while the temperature is maintained at 80° C. After the addition is complete, stirring at 80° C. is continued for 3 hours. To the solution is added 163.3 parts of toluene to give a 50% solids solution.

This product is brushed onto wood and allowed to air-cure. It has excellent adhesion to the wood, is hard, tough and durable. It is an exceptionally good primer for use in painting exterior wood surfaces. When stored in a closed container, it is stable, i.e., it shows no increase in viscosity over long periods of time.

Example 9

194 parts of polytetramethylene ether glycol of molecular weight 970, 40.2 parts of trimethylol propane and 157.2 parts of a mixture of 80% toluene-2,4-diisocyanate and 20% toluene-2,6-diisocyanate are added to 195.7 parts of methylisobutyl ketone and stirred 3 hours at 80° C. Then 195.7 parts of toluene is added to give a 50% total solids solution.

This solution is sprayed onto wood as a varnish. It cures rapidly to a tough film having high resistance to abrasion. The film has a tensile strength of 3700 lbs. and an elongation at the break of 125%. It is an excellent furniture finish, being resistant to wear and scratching as well as to solvents and cleaning media.

Example 10

95.5 parts of polytetramethylene ether glycol of molecular weight 955, 8.8 parts of 2,3-butenediol-1,4, 26.8 parts of trimethylol propane and 156.6 parts of toluene-2,4-diisocyanate are stirred with 96 parts of methylethyl ketone and heated at 90–95° C. for 5 hours. The resulting solution is used as a flood varnish by brushing onto a wood floor. It cures overnight to a tough, mar-resistant finish with excellent adherence to the wood. It is sufficiently flexible to resist cracking when dented by heavy objects.

As many widely different embodiments of this invention may be made without departing from the spirit and scope thereof, it is to be understood that this invention is not limited to the specific embodiments thereof except as defined in the appended claims.

This application is a continuation-in-part of copending application Serial No. 561,947, filed January 27, 1956, now abandoned.

What is claimed is:

1. A stable, curable polyurethane coating composition obtained by heating to a temperature of about 50 to 120° C. in an inert solvent (a) 1.0 molar proportion of a polytetramethylene ether glycol having a molecular weight of from about 400 to 2,000, (b) 0 to 1.0 molar proportion of an aliphatic diol having 2 to 8 carbon atoms, (c) 1.0 to 4.0 molar proportions of an aliphatic triol having from 3 to 6 carbon atoms, and (d) 4.0 to 11.0 molar proportions of an organic diisocyanate, until substantially all of the hydroxyl groups have been reacted with isocyanate groups; with the proviso that at least 25% by weight of the composition be the radicals obtained by removing the terminal hydrogens from the polytetramethylene ether glycol and that the molar proportion of organic diisocyanate which is used is such that the number of isocyanate groups is at least 3 greater than but less than twice the sum of all of the hydroxyl groups introduced into the reaction.

2. A stable, curable polyurethane coating composition obtained by heating to a temperature of about 80° C. in an inert solvent (a) 1.0 molar proportion of a polytetramethylene ether glycol having a molecular weight of from about 400 to 2,000, (b) 1.0 molar proportion of an aliphatic diol having from 2 to 8 carbon atoms, (c) 2.0 molar proportions of an aliphatic triol having from 3 to 6 carbon atoms, and (d) 7 molar proportions of an organic diisocyanate until substantially all of the hydroxyl groups have been reacted with isocyanate groups; with the proviso that at least 25% by weight of the composition be the radicals obtained by removing the terminal hydrogens from the polytetramethylene ether glycol.

3. A stable, curable polyurethane coating composition of claim 2 wherein the aliphatic diol is pentane-1,5-diol, the aliphatic triol is trimethylol propane and the organic diisocyanate is toluene-2,4-diisocyanate.

4. A stable, curable polyurethane coating composition obtained by heating to a temperature of about 120° C. in an inert solvent (a) 1.0 molar proportion of a polytetramethylene ether glycol having a molecular weight of from about 400 to 2,000, (b) 1.0 molar proportion of an aliphatic diol having from 2 to 8 carbon atoms, (c) 2.0 molar proportions of an aliphatic triol having from 3 to 6 carbon atoms, and (d) 8 molar proportions of an organic diisocyanate until substantially all of the hydroxyl groups have been reacted with isocyanate groups; with the proviso that at least 25% by weight of the composition be the radicals obtained by removing the terminal hydrogens from the polytetramethylene ether glycol.

References Cited in the file of this patent

UNITED STATES PATENTS

| | | |
|---|---|---|
| 2,621,166 | Schmidt et al. | Dec. 9, 1952 |
| 2,726,219 | Hill | Dec. 6, 1955 |

FOREIGN PATENTS

| | | |
|---|---|---|
| 52,968 | France | Aug. 27, 1945 |
| 1,074,451 | France | Oct. 6, 1954 |
| 164,975 | Australia | Sept. 5, 1955 |
| 1,108,785 | France | Sept. 14, 1955 |

OTHER REFERENCES

Heiss et al.: Ind. and Eng. Chem., vol. 46, No. 7, July 1954, pages 1498–1503. (Copy in Scientific Library.)